Nov. 3, 1931.  O. O. THWING  1,830,574
PROCESS OF MAKING COMBUSTIBLE GAS FROM LIQUID FUEL
Filed Jan. 26, 1925   4 Sheets-Sheet 1
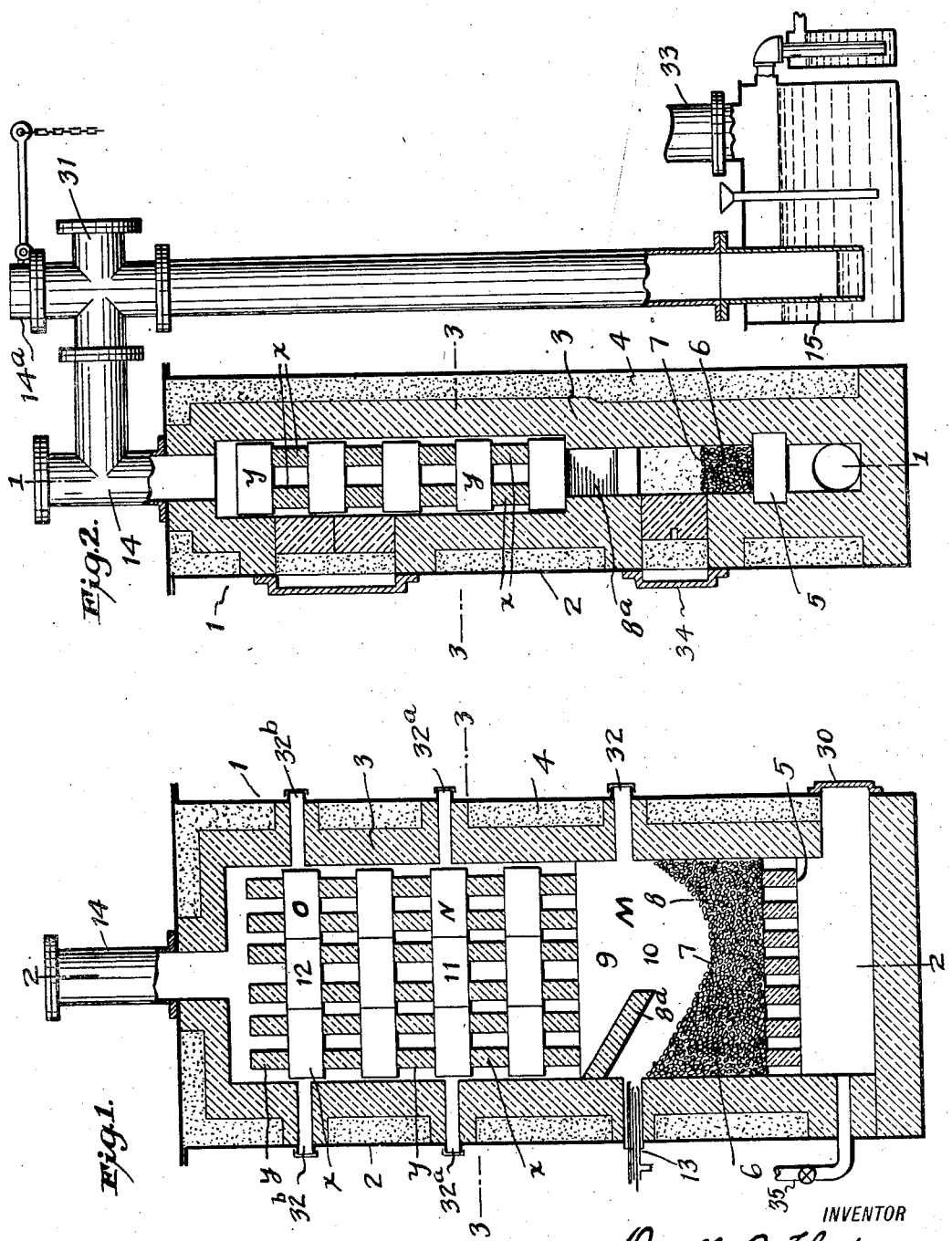
INVENTOR
Orrell O Thwing
BY
Edwin A Packard
HIS ATTORNEY Nov. 3, 1931.   O. O. THWING   1,830,574
PROCESS OF MAKING COMBUSTIBLE GAS FROM LIQUID FUEL
Filed Jan. 26, 1925   4 Sheets-Sheet 2
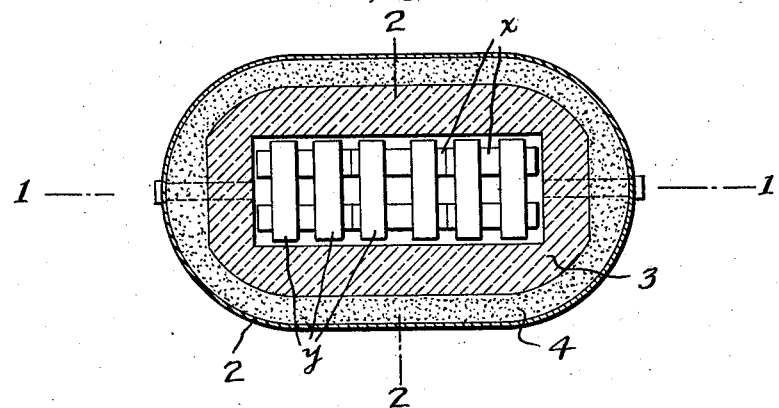
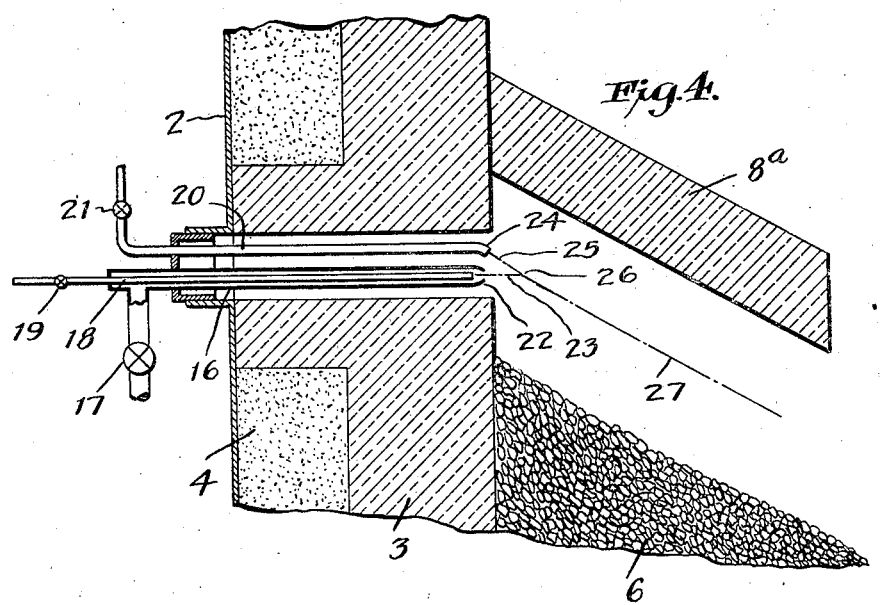
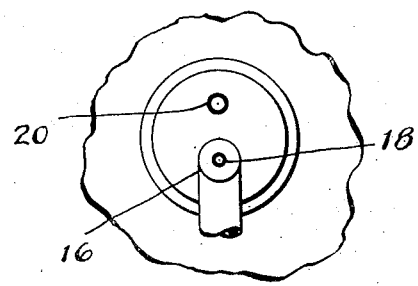
INVENTOR
Orell O Thwing
BY
Edwin A Pickard
HIS ATTORNEY

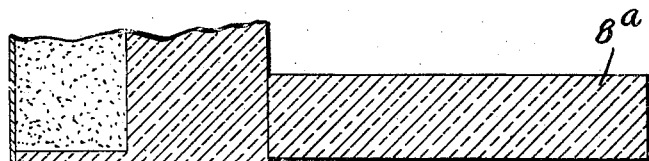
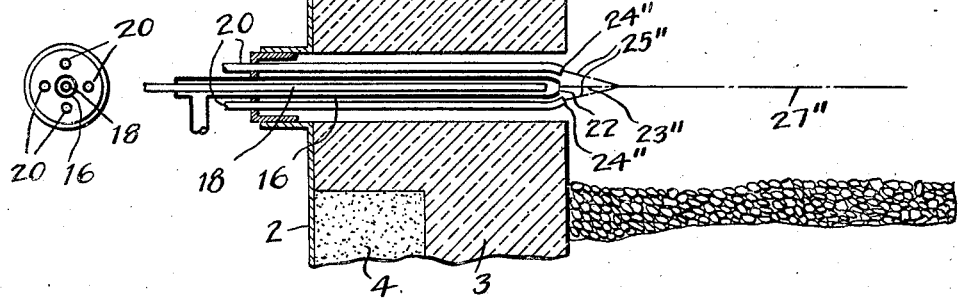
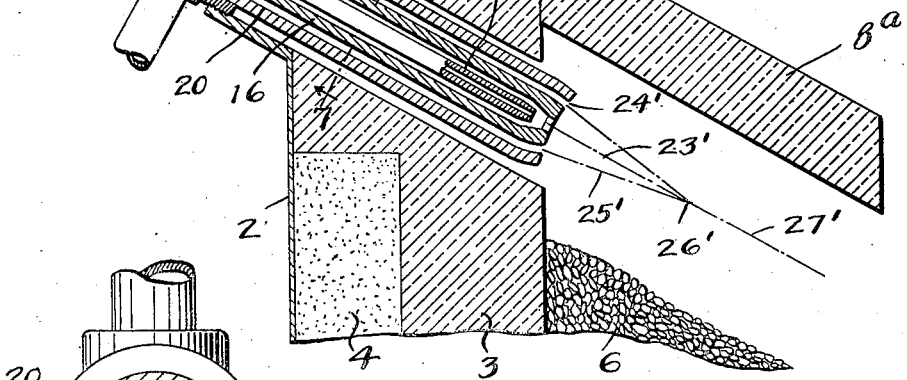

Nov. 3, 1931.    O. O. THWING    1,830,574
PROCESS OF MAKING COMBUSTIBLE GAS FROM LIQUID FUEL
Filed Jan. 26, 1925    4 Sheets-Sheet 4

INVENTOR
Orrell O Thwing
BY
HIS ATTORNEY

Patented Nov. 3, 1931

1,830,574

UNITED STATES PATENT OFFICE

ORRELL O. THWING, OF NEW YORK, N. Y.; ANNIE THWING, EXECUTRIX OF SAID ORRELL O. THWING, DECEASED, ASSIGNOR TO GENERAL OIL GAS CORPORATION, OF NEW YORK, N. Y., A CORPORATION OF VIRGINIA

PROCESS OF MAKING COMBUSTIBLE GAS FROM LIQUID FUEL

Application filed January 26, 1925. Serial No. 4,720.

The invention relates to the gasifying of fuel in liquid form (and especially such as oil, cresol, phenol, or any of the hydrocarbons or mixtures thereof which are liquid at atmospheric pressures and at normal temperatures, to wit, approximately 60 to 80 degrees F., that unite and burn with oxygen) and has particular reference to the production of gas as the result of partial combustion which is supported and maintained by a supply of substantially pure free oxygen or a mixture of oxygen and inert gas in which mixture oxygen is substantially sixty (60) percent or upwards.

According to the invention it is possible to produce by a continuous process from fuel in finely divided state, for example, from liquid hydrocarbons atomized by steam, gas of a predetermined and substantially constant calorific value by directing a stream of oxygen into contact with a directed stream of the finely divided fuel under conditions whereby any overheating, particularly at or during the initial gas making stages, is avoided and whereby the free or uncombined oxygen gradually mixes with the fuel and gas stream whereby a progressive and prolonged partial combustion is maintained and carried out in a manner to produce the desired gas.

It is appreciated that if pure uncombined oxygen and finely divided fuel are allowed to intimately mix in a relatively small localized space a relatively intense combustion ensues of a character which will unduly overheat the parts of the gas making structure in the immediate vicinity where the overheating occurs, and there also follows an undue heating or complete combustion of some of the gas making materials being processed—or gasified—and a resulting or consequent precipitation of a substantial amount of fine carbon or "lampblack", as it is frequently termed.

The present invention has in view the bringing of the oxygen in contact with the gas making materials, to wit, the finely divided fuel as atomized liquid hydrocarbon, in a manner to avoid the objectionable features above pointed out and in a manner whereby any desired gas within reasonable limits can be produced, and preferably according to a continuous process.

The invention pertains to both a process for realizing and apparatus constructed to realize the desired ends and further aspects or objects of the invention will be manifest from the description that follows and also from the appended claims.

As illustrating how the invention may be realized reference is made to the drawings accompanying this specification and constituting a part hereof and in which drawings, Figure 1 is a vertical sectional view of a fuel gasifying generator within which the invention may be performed; this figure is a view taken as on the vertical plane indicated by the lines 1—1 of Figures 2 and 3.

Figure 2 is a vertical sectional view at right angles to that of Figure 1 and is a view taken as on the plane indicated by the lines 2—2 of Figures 1 and 3.

Figure 3 is a horizontal sectional view taken as on a plane indicated by the lines 3—3 of Figures 1 and 2.

Figure 4 is a vertical sectional view of the ignition portion—or radian ignition portion—of the gasifying generator of Figure 1, said Figure 4 also showing the steam and liquid fuel directing means and spaced therefrom the oxygen directing means which two sets of means may be collectively referred to as a burner. In said Figure 4 the parts are shown at a larger scale than in Figure 1.

Figure 5 is a vertical exterior view of the burner of Figure 4.

Figure 6 is a vertical sectional view and shows another form of burner in association with a radiant ignition portion of a gasifying generator.

Figure 7 is a cross-sectional view of the burner of Figure 6, taken as on the plane indicated by line 7—7.

Figure 8 is a vertical sectional view and shows another form of burner in association with a horizontal form of ignition chamber.

Figure 9 is a vertical exterior or end view of the burner of Figure 8.

Figure 10:
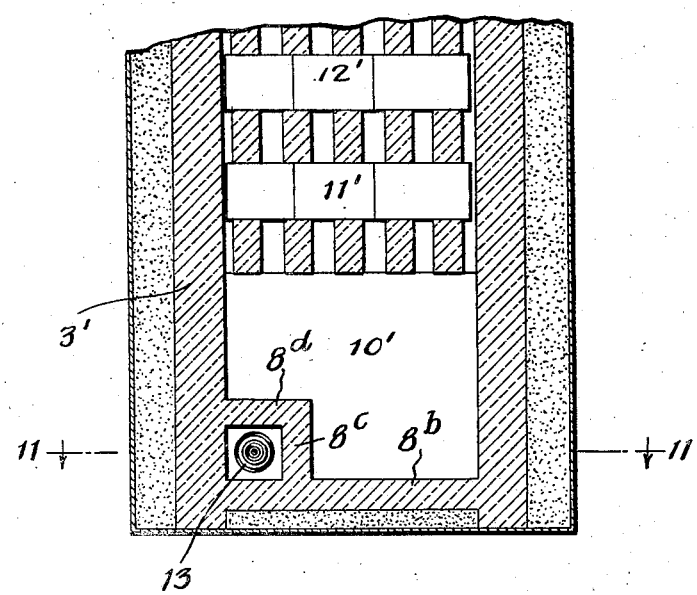
Figure 10 is a vertical sectional view of another form of gasifying generator and is a view taken as on a plane indicated by the line 10—10 of Figure 11; while the upper portion of Figure 10 is broken away.

Reference will now be made to the drawings in detail.

*Gasifying generator structure (of Figures 1 to 3)*

1 indicates a gasifying generator particularly adaptable for the production—from oil atomized by steam and with a continuous supply of free relatively pure oxygen—by a continuous process of gas of a predetermined and substantially constant calorific value. In fact such a gas has been repeatedly produced in the gasifying generator of Figures 1 to 3. This generator is gas-tight whereby the process is under control and it comprehends a metallic shell 2 made up in the main of metal sheets having joints made tight by welding or otherwise. It has an inner wall 3 made up of suitable refractories and a heat insulating section 4 of any suitable material. The generator shown has a grate or suitable supporting means formed as of refractory bricks 5 upon which there are directly supported relatively coarse pieces of refractory, as carborundum 6, followed by smaller pieces of refractory, as carborundum 7. These carborundum pieces collectively constitute or provide the bottom or lower wall 8 of the gasifying zone or chamber The interior of the gasifying chamber above the wall 8 will arbitrarily be referred to herein as the gasifying zone 9 and comprehends what is herein termed as the initial gasifying portion 10, a second gasifying and fixing portion 11, and a final heat storage portion 12. Within the gasifying generator 1 there is provided a checker-work of cross bricks $x$ and $y$ that materially provide the heat storing function by receiving and storing heat and later give it off, thus serving to assist in maintaining the process and product uniform.

While the gasifying generator is described as being gas-tight, it will be understood that when functioning to produce gas it is gas-tight except there is provided means, to wit, the burners or burner 13 by which there is introduced the desired and proportional amounts of gas producing ingredients and there is also provided the necessary gas removing means, as the off-take 14, which is connected in a gas off-take system so as to permit the removing of the gas without permitting a back flow because, for example, of the hydraulic seal at 15. The burner injects the oil atomized by the steam and the oxygen preferably into a definite restricted radiant ignition portion—defined above by the sloping arch or baffle 8a and below by the upper portion of the wall 8, to wit, that portion which is below but opposite or opposed to the sloping arch or baffle 8a—constituting a restricted part of the initial gasifying portion 10 of the gasifying zone.

*Burner*

The burner actually employed in the apparatus of Figures 1 to 3 is shown at larger scale in Figures 4 and 5 and comprehends a steam supply pipe 16 which is regulated or controlled, as by valve 17, oil supply pipe 18 which is concentric with and extends within the steam supply pipe 16 and which is regulated or controlled by a valve 19, and an associated oxygen supply pipe 20 regulated or controlled as by valve 21. The steam and oil pipe, when steam and oil are flowing therethrough, co-operate to direct therefrom in a substantial defined path a stream of liquid hydrocarbon—such as oil—atomized by the steam; in other words, the delivery end 22 of the pipe constitutes a source which continuously directs a stream of the atomized liquid fuel forwardly along a defined path 23. Likewise the delivery end 24 of the oxygen supply pipe 20 constitutes a source which continuously directs a stream of oxygen forwardly along a defined path 25. It will be noted that the delivery end or source of oxygen supply 24 is spaced from the source of liquid fuel delivery 22 and that the forwardly or inwardly flowing liquid fuel and oxygen travel in the same general direction but gradually toward each other with the result that they commence to contact at substantially definite loci, as substantially at 26, where ignition begins and therefrom the fuel, gas stream and oxygen travel along the deflected paths indicated by line 27 within the radiant ignition portion, as will hereinafter more fully appear.

The burner of Figures 6 and 7 has a steam pipe 16 with oil pipe 18 therein and an oxygen supply pipe 20 which in cooperation with steam pipe 16 provides the oxygen delivery source 24' from which the oxygen is directed along a conical path indicated by 25' toward the atomized fuel path indicated by 23'. where the oxygen and fuel commence to meet—ignition beginning—as indicated by locus 26' and thereafter flow along the path indicated by 27'.

The burner of Figures 8 and 9 has a steam pipe 16 with oil pipe 18 therein and four oxygen delivering pipes 20. It will be noted that the oil atomized by steam or other suitable atomized fluid as air, leaves from source 22 so as to be directed along the path 23'' and that the paths of the directed oxygen from the delivery sources 24'' of the oxygen supply pipes 20 are along the paths 25'' and that the general paths thereafter are along the line 27''. An essential of all forms of the burners is that the steam, oil and oxygen be delivered in regulated or controlled amounts dependent upon the character of gas desired, that the oxygen be supplied from sources spaced from the fuel delivery sources, that the oxygen be directed in the same general path, or direction of flow, of the atomized fuel, that the fuel and oxygen gradually approach but that they will not commence to contact and therefore ignite before a certain loci has been reached, but that they will commence to contact at about said loci; in other words, the oxygen and fuel must not commence to burn sufficiently close to the burners or other structural parts near the source of delivery to cause overheating, and it will also here be noted that the partial combustion set up when the oxygen commences to contact with the fuel must be prolonged and progressive and at no time be intense during the gas making process.

The speed of delivery of the steam, oil and oxygen can be relied upon in connection with the directional functions of the burner to regulate the loci or place where the contact of oxygen and fuel begins and there must not result eddying currents of a character to create undue heat near the burner or even elsewhere. The burner actually used in the apparatus of Figures 1 to 3 and shown somewhat more clearly in Figures 4 and 5 has been successfully used with steam from a pressure source of 12 pounds (gauge) and with oxygen from a pressure source of 12 pounds (gauge). It will be remarked that the other burners described could be used if desired in the production of the desired gas.

Figure 11:
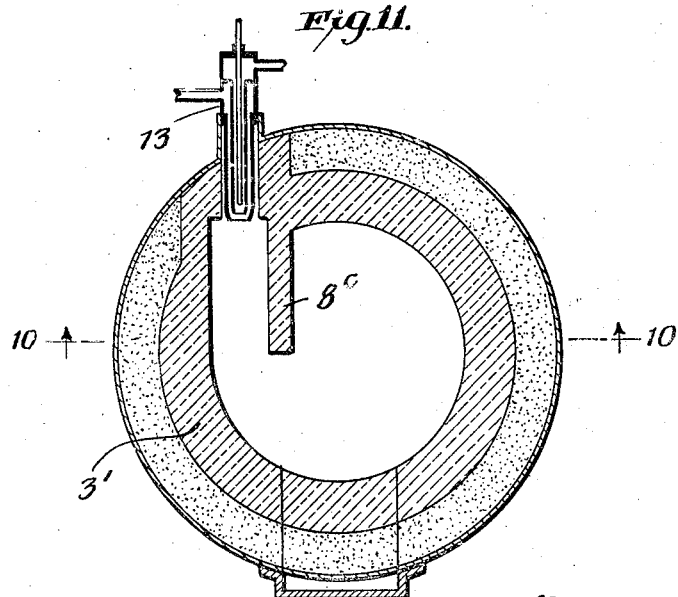
Figure 11 is a horizontal view taken as on a plane indicated by the line 11—11 of Figure 10.

Gasifying generator (form of Figures 10 and 11)

Here a gasifying generator is shown of a type which is cylindrical in horizontal cross-section. According to the arrangement shown a burner 13—such as shown in Figures 6 and 7—directs the gas making materials into a restricted radiant ignition portion defined by a part of the inner wall or lining 3', by a part of the floor or bottom wall 8b and by arch or baffle-like members 8c and 8d, and the partial combustion started in the ignition portion progresses in a spiral path through the initial gasifying portion 10', upwardly through the second gasifying portion 11' and the resulting gas continues to travel upwardly through the final heat storing portion 12' until it is finally removed from the gasifying generator.

Heating the gasifying generator ready for the process

It will first be necessary to bring the gasifying generator up to the desired temperature and this is accomplished in any suitable manner. For example, in the apparatus of Figures 1 to 3 ignition means may be supplied by placing lighted kindling, paper or oiled rags on the refractory wall 8 in the zone 9 through the door 34. Liquid fuel and oxygen, or preferably air, will be discharged by means of burner 13 and ignited by the ignition means. Additional air to produce complete combustion is supplied through air pipe 35, which air passes up through the pervious refractory beds 6 and 7 into the combustion zone 10. The products of combustion pass off through the checker brick $x$ and $y$ in the zones 11 and 12, heating these portions to proper temperatures for gasification, and afterward passing therefrom through off-take pipe 14 and purge valve 14a to the atmosphere. During the heating up period incomplete combustion may be produced in zone 10 and the combustion completed by admitting air through pipes at 32a and 32b to heat more rapidly the zones 10 and 11. When the desired heat is attained the temporary air supplies are cut off; the purge valve 14a leading to the atmosphere or stack is also closed. Now the process can begin.

If desired the bringing to the desired temperatures could be attained by using the burner 13 alone but instead of using oxygen there would probably be used a temporary air supply. The gasifying generator of Figures 10 and 11 would probably be best brought to the desired temperatures by using the burner thereof in the manner just indicated.

Process of making gas

It will be noted that combustible gas having any reasonable heat value can be made continuously and of a substantial uniform character. There will be described a typifying process by which a combustible gas having a calorific heat value, for example 550 British thermal units per cubic foot of gas, is generally figured. To make a thousand cubic feet of such gas there is approximately required 4.9 gallons of oil, between 10-15 pounds of saturated steam supplied from a pressure of about 10 pounds, and from 250 to 300 cubic feet of substantially pure oxygen supplied from a pressure of about 12 pounds (gauge). The oil is atomized by the steam, or even air, and directed as along the defined paths described in connection with the burner. The oxygen is also supplied from a source distant from the oil supply, so that the stream (or streams) of oxygen flow in the same general direction as the atomized fuel and so that they meet or rather commence to contact at loci definitely located from the source of oxygen supply, as well as from the source of fuel supply. The rates of flow and the mode and condition of flow of the streams of fuel and oxygen are such that there is no undue heating, due to the early or initial partial combustion that results, of the burners or adjacent parts and the consuming of the oxygen is prolonged so that there is a progressive and prolonged partial combustion until all of the free or uncombined oxygen is exhausted.

As has been previously indicated the atomized liquid fuel and oxygen commence to contact and ignite in the radiant ignition zone (defined in effect as by a part of the bottom wall 8 and by the inclined arch or baffle 8a) of the initial gasifying portion 10 and within which the temperature as taken by pyrometer readings is approximately 1600 degrees F. at the point M. The liquid fuel and gas stream and the uncombined oxygen pass upwardly and the uncombined oxygen gradually unites with the liquid fuel and gas streams so that the ignition, initiated in the radiant ignition zone, continues and is progressive and prolonged as partial combustion continues into the second gasifying and fixing portion 11 where the temperature is normally higher, approximating 1700 degrees F. at the part N as taken by pyrometer readings. Within the second gasifying portion 11 the gas conversion is substantially completed by the resulting gas is caused to pass upwardly into and through the final heat storing portion 12 within which the temperature of the gas is reduced. This temperature of the portion 12 at the point O, as taken by pyrometer readings, is approximately 1350 degrees F. The gas is removed or withdrawn from the gasifying zone through the off-takes 14, as by an exhauster, not shown, connected to the pipe 33 which exhausted creates a pressure differential interiorly of the gasifying generator whereby the oil, oxygen and resulting reaction products are induced along and through the various zones of the generator.

Dependent upon the quality of the gas desired it is feasible to employ temperatures at the initial gasifying portion of between 1000–2000 degrees F., in the second gasifying portion of a slightly hotter temperature of between 1100–2100 degrees F., and with resulting corresponding lower temperatures in the final heat storage portion.

The temperature at the points indicated can be relied upon as indication of the performance of the process for when the process is set for a particular type of gas the temperature at this point should remain relatively constant.

It will be manifest that the process herein described is capable of producing as desired various types of gas but that where a definite type of combustible gas is desired such gas can be produced by a continuous process and of a constant character and calorific value.

It will be noted that the expression "substantially free oxygen" is intended to include any gaseous medium in which there is oxygen and inert gas and in which mixture oxygen is substantially sixty (60) percent or upward. Ordinary air contains only about 20% oxygen and the invention in this case involves the utilization of what may be considered gaseous medium having a concentrated oxygen content.

It will also be manifest that the process and apparatus employed may be realized and embodied in various ways without departing from the spirit and scope of the invention.

What I claim is:

1. The method of producing oil gas, comprising directing a stream of oil atomized by steam into a gasifying zone and in the presence of radiant heat from hot refractory parts constituting opposite defines of a definite restricted radiant initial ignition portion of the gasifying zone within which initial ignition portion there is a substantial constant temperature of between 1000 and 2000 degrees F., but within which gasifying zone there is a succeeding second portion constituting a gasifying and fixing portion having a constant higher temperature of between 1100 and 2100 degrees F. which is in turn followed by a heat storing portion having lower temperatures, directing a stream of substantially free oxygen toward the stream of atomized oil and in the same general direction of flow thereof so that the oxygen and atomized oil commence to unite only at a locality distant from their initial delivery, causing the oil, oxygen and resulting reaction products to progressively flow first along the restricted radiant initial ignition portion, thence along the rest of the gasifying zone for producing substantially fixed combustible gas, and removing said oil gas from the gasification zone.

2. The continuous manufacture of oil gas of a calorific value approximately 550 B. T. U. per cubic foot of gas at atmospheric pressures, comprising continuously supplying approximately 4.9 gallons of oil with ten to fifteen pounds of saturated steam and 250 to 300 cubic feet of substantially free oxygen for the production of each thousand cubic feet of gas into a gasifying zone within which there is maintained a substantially constant temperature of approximately 1600° F. in its initial gasifying portion, a temperature of approximately 1700° F. in the second gasifying portion, and a temperature gradually decreasing to approximately 1350° F. in a final heat storage portion, the steam being delivered under pressure sufficient to atomize the oil and discharge it into the initial gasifying portion and the oxygen being delivered under sufficient pressure to direct it toward and along the inwardly flowing atomized oil, so that the oil and oxygen combine at a locality distant from the point of delivery, whereby ignition starts at the initial gasifying portion and partial combustion continues without objectionable eddying into the hotter second gasifying portion and from which hotter second gasifying portion the gases enter into and flow through the final heat storage portion, and removing the oil gas from the final heat storage portion.

3. The process of producing combustible gas of predetermined substantially constant composition and calorific value, by the heat and reactions of and resulting from incomplete combustion by injecting a regulated amount of liquid fuel atomized by a regulated amount of steam into an initial portion of a gasifying zone and which initial portion has a maintained temperature of between approximately 1000 and 2000 degrees F. and within which said initial portion heat is created by partial combustion which is supported by substantially free oxygen supplied to said initial portion in a manner that the oxygen flows in the same general direction that the fuel flows, which oxygen commences to contact and burn the fuel only when the latter is a distance from the place by and from which the fuel is delivered, by ensuring that the combining oxygen, fuel and gaseous stream continue to move along in the same general direction whereby the partial combustion is progressive and prolonged until the stream is in a hotter second gasifying portion that is between approximately 1100 and 2100 degrees F. and within which hotter second gasifying portion the exhausting of the free oxygen is completed, by causing the hot gaseous products of or resulting from the partial combustion within the initial and second gasifying portions to continue along and intermingle until the temperature of the gaseous stream is reduced below the temperature of the second gasifying portion, and by removing the combustible gas.

4. The manufacture of a combustible gas of a predetermined and constant calorific value by a method, comprising introducing into and bringing together within a restricted radiant ignition portion a continuous supply of atomized liquid fuel and substantially free oxygen but under conditions that the oxygen and fuel commence to unite only at a locality distant from the places of their initial delivery and travel in the same general direction while and during there is taking place a prolonged and progressive incomplete combustion that extends through an initial gasifying portion wherein there is a constant temperature of approximately 1600 degrees F. of which said restricted radiant ignition portion constitutes a part into and within a second gasifying portion of higher temperature than that of the restricted radiant initial portion and wherein the gasification is completed within the presence of heat storing material of a final heat storing portion and into and through which the hot gases of the process pass, and continuously removing the gas thus produced.

5. A liquid fuel gasifying generator comprising a refractory heat insulated housing enclosing a gasifying chamber, a pervious body of refractory material in a bottom portion of said chamber, means for admitting air as desired through said pervious portion, means for discharging liquid fuel in atomized form into the lower portion of said chamber, means for supplying oxygen to said liquid fuel, the liquid fuel and oxygen supply means being arranged so that the oxygen will not contact with the liquid fuel until they are both a substantial distance from their respective delivering means, and an off-take for removing from the upper portion of the gasifying chamber the resulting gases, said chamber also having therein a heat storage of refractory material, such as checker-brick, through which the produced gases pass before leaving the gas making generator, said generator having a baffle defining with the refractory material in the bottom portion a restricted radiant ignition portion into and through which the introduced liquid fuel enters and passes to and into the principal gasifying zone.

In witness whereof I have hereunto signed my name.

ORRELL O. THWING.